(12) United States Patent
Shirron et al.

(10) Patent No.: US 9,384,331 B2
(45) Date of Patent: Jul. 5, 2016

(54) DEVICE, SYSTEM AND METHOD OF WIRELESSLY DELIVERING CONTENT

(75) Inventors: Etan Shirron, Hod-Hasharon (IL); Yossi Weisblum, Kfar-Saba (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/096,190

(22) Filed: Apr. 28, 2011

(65) Prior Publication Data

US 2012/0278192 A1   Nov. 1, 2012

(51) Int. Cl.
*G06F 21/00* (2013.01)
*G06F 21/10* (2013.01)
*G06Q 20/12* (2012.01)
*G06Q 20/32* (2012.01)
*H04B 5/00* (2006.01)

(52) U.S. Cl.
CPC .............. *G06F 21/10* (2013.01); *G06Q 20/123* (2013.01); *G06Q 20/3278* (2013.01); *H04B 5/0031* (2013.01)

(58) Field of Classification Search
USPC .......................................................... 705/56
See application file for complete search history.

(56) References Cited

U.S. PATENT DOCUMENTS

| | | | |
|---|---|---|---|
| 7,872,995 B2 * | 1/2011 | Fujii et al. ..................... 370/310 |
| 7,965,981 B2 * | 6/2011 | Bloebaum ......... G06F 17/30876 |
| | | | 455/41.1 |
| 2004/0203800 A1 | 10/2004 | Myhre et al. | |
| 2006/0053289 A1 * | 3/2006 | Singh .................... H04L 9/3273 |
| | | | 713/169 |
| 2006/0235761 A1 * | 10/2006 | Johnson ................. G06Q 20/02 |
| | | | 705/26.1 |
| 2006/0258289 A1 * | 11/2006 | Dua .................. G06F 17/30058 |
| | | | 455/41.3 |
| 2008/0079573 A1 | 4/2008 | Bloebaum et al. | |

(Continued)

FOREIGN PATENT DOCUMENTS

CN   101843124   9/2010
EP   1898598   3/2008

(Continued)

OTHER PUBLICATIONS

IEEE 100 The Authoritative Dictionary of IEEE Standard Terms Seventh Edition, IEEE Press.*

(Continued)

*Primary Examiner* — Zeshan Qayyum
(74) *Attorney, Agent, or Firm* — Shichrur & Co.

(57) ABSTRACT

Some demonstrative embodiments include devices, systems and/or methods of wirelessly delivering content. For example, a method may include receiving at a first wireless communication device a request from a second wireless communication device via a first communication link of a first wireless communication protocol having a first coverage range, the request indicating requested content to be transferred from the first wireless communication device to the second wireless communication device; transmitting over the first communication link a session-handoff message from the first wireless communication device to the second wireless communication device, the session-handoff message including one or more link-related parameters defining a second wireless communication link of a second wireless communication protocol having a second coverage range, which is greater than the first coverage range; and transmitting the requested content from the first wireless communication device to the second wireless communication device over the second wireless communication link.

17 Claims, 2 Drawing Sheets

(56) References Cited

U.S. PATENT DOCUMENTS

| | | | | |
|---|---|---|---|---|
| 2009/0111378 | A1* | 4/2009 | Sheynman | H04W 8/005 455/41.1 |
| 2009/0191811 | A1 | 7/2009 | Griffin et al. | |
| 2009/0221271 | A1 | 9/2009 | Soma et al. | |
| 2009/0275346 | A1 | 11/2009 | Bauman et al. | |
| 2010/0078471 | A1* | 4/2010 | Lin et al. | 235/379 |
| 2010/0082481 | A1* | 4/2010 | Lin | G06Q 20/042 705/41 |
| 2010/0093278 | A1 | 4/2010 | Abel et al. | |
| 2010/0205274 | A1* | 8/2010 | Gharabally et al. | 709/217 |
| 2010/0211685 | A1 | 8/2010 | McDowall et al. | |
| 2010/0235464 | A1 | 9/2010 | Iyer et al. | |
| 2011/0070837 | A1 | 3/2011 | Griffin et al. | |
| 2012/0054664 | A1* | 3/2012 | Dougall et al. | 715/772 |

FOREIGN PATENT DOCUMENTS

| | | |
|---|---|---|
| EP | 2302882 | 3/2011 |
| JP | 2008067104 | 3/2008 |
| JP | 2009-207069 A | 9/2009 |
| JP | 2010503298 | 1/2010 |
| JP | 2010-288209 A | 12/2010 |
| WO | 2008028555 | 3/2008 |
| WO | 2010128962 | 11/2010 |

OTHER PUBLICATIONS

Applied Cryptography by Bruce Schneier 2nd edition, John Wiley & Sons Inc. 1996 (p. 33).*
ISO/IEC 14443 Parts 1-4 :Identification cards—Contactless integrated circuit(s) cards 1999.
ISO/IEC 18092:Information technology—Telecommunications and information exchange between systems—Near Field Communication—Interface and Protocol (NFCIP-1).
ISO/IEC 21481:2005:Information technology—Telecommunications and information exchange between systems—Near Field Communication Interface and Protocol-2 (NFCIP-2).
NFC Forum Data Exchange Format (NDEF) Technical Specification Version 1.0; Jul. 24, 2006.
NFC Forum Connection Handover 1.2 Technical Specification Jul. 7, 2010.
WiFi Alliance Wi-Fi Protected Setup Specification Version 1.0h.
Wireless Gigabit Alliance WiGig Mac and PHY specification Version1.0; Apr. 2010.
IEEE Standard for Information technology—Telecommunications and information exchange between systems—Local and metropolitan area networks—Specific requirements; Part 11: Wireless LAN Medium Access Control (MAC) and Physical Layer (PHY) Specifications; IEEE Std 802.11™—2007(Revision of IEEE Std 802.11-1999 ).
International Search Report and Written Opinion for PCT Patent Application No. PCT/US2012/029349, Mailed on Oct. 12, 2012, 8 pages.
International Preliminary Report on Patentability for International Patent Application No. PCT/US2012/029349, mailed on Nov. 7, 2013, 5 pages.
Office Action and Search Report for Chinese Patent Application No. 201210143425.9, mailed on Feb. 24, 2014, 14 pages, including 8 pages of English translation.
Office Action for Japanese Patent Application No. 2012-059304, mailed on Apr. 1, 2014, 4 pages, including 2 pages of English translation.
Office Action for Japanese Patent Application No. 2012-059304, mailed on Jun. 4, 2013, including 3 pages of English translation.
Office Action for Chinese Patent Application No. 201210143425.9, mailed on Oct. 8, 2014, 14 pages, including 9 pages of English translation.
Extended European Search Report for European Patent Application No. 12777575.7, mailed on Oct. 13, 2014, 9 pages.
Josef Langer et al., Anwendungen und Technik von Near Field Communication (NFC), Springer, Heidelberg, Sep. 16, 2010, XP055143433, pp. 100, 137-143, 145-152, 174, 178-180, 226-227, 34 pages total.
Yasir Arfat Malkani et al., "Chapter 1: Secure Device Association, Trens and Issues" In: Al-Sakib Khan Pathan: "Security of Self-Organizing Networks: MANET, WSN, WMN, VANET", Auerbach Publications, Oct. 14, 2010, XP055143444, pp. 7-24, 18 pages total.
Emile H.L. Aarts et al., "True Visions: The Emergence of Ambient Intelligence", Springer, Dec. 8, 2008, XP055143446, pp. 177-180, 4 pages total.
Guido R Hiertz et al., "Spontane Funknetze, WLAN-Protokollerweiterungen fur bessere Ad-hoc-Vernetzung", Heise, Internet article, Nov. 26, 2009, XP055143500, Retrieved from the Internet: URL:http://www.heise.de/netze/artikel/Spontane-Funknetze-864421.html?view=print, p. 5, 9 pages total.
Wikipedia, "Content Adaptation", Internet article, Apr. 2, 2011, XP055143589, Retrieved from the Internet: URL:http://en.wikipedia.org/w/index.php?title=Content_adaptation &oldid=42207112, 3 pages.
Wikipedia, "Frequency-hopping Spread Spectrum", Internet article, Apr. 24, 2011, XP055143694, Retrieved from the Internet: URL:http://en.wikipedia.org/w/index.php?title=Frequency-hopping_spread_spectrum&oldid=425613028, Selection "Variations of FHSS", 5 pages.
Office Action for Korean Patent Application No. 10-2013-7028311, mailed on Dec. 11, 2014, 9 pages, including 4 pages of English translation.
Office Action for Chinese Patent Application No. 201210143425.9, mailed on Apr. 24, 2015, 23 pages, including 16 pages of English translation.
Office Action for Korean Patent Application No. 10-2013-7028311, mailed on Jun. 25, 2015, 5 pages.
Dffice Action for Chinese Patent Application Serial No. 201210143425.9, mailed on Nov. 6, 2015, 7 pages (including 4 pages of English translation).
Office Action for European Patent Application Serial No. 12/777,575.7, mailed on Apr. 15, 2016, 9 pages.
J Suomalainen et al: "NCR-TR-2007-004 Standards for security associations in personal networks: a comparative analysis", Nokia, Jan. 9, 2007, XP055262208, Retrieved from the Internet: URL: http://citeseerx.ist.psu.edu/viewdoc/download?doi=10.1.1.71445 &rep=rep1&type=pdf [retrieved on Apr. 1, 2016], 18 pages.
Wikipedia: "List of Bluetooth profiles", Internet Article, Apr. 24, 2011, XP055262375, Retrieved from the Internet:URL:https://en.wikipedia.org/w/index.php?title=List_of$_{13}$ Bluetooth_profiles &oldid=425697672 [retrieved on Apr. 4, 2016], 9 pages.
Hu Hanrahan: "Network Convergence: Services, Applications, Transport, and Operations Support," Apr. 2, 2007, Wiley, XP055262311, ISBN:978-0-470-02441-6 pp. 142-143, 4 pages.
Wikipedia:Pull technology, Internet Article, Feb. 6, 2011, XP055264492, Retrieved from the Internet: URL:https://en.wikipedia.org/w/index.php? title=Pull_technology &oldid=412332683 [retrieved on Apr. 12, 2016], 1 page.

* cited by examiner

DEVICE, SYSTEM AND METHOD OF WIRELESSLY DELIVERING CONTENT

BACKGROUND

A wireless communication device may utilize Near Field Communication (NFC) for wireless communication over a relatively short range, e.g., less than ten centimeters.

A mobile device, e.g., a mobile phone, may utilize a NFC link for various applications including, for example, mobile ticketing, mobile payment, and the like.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
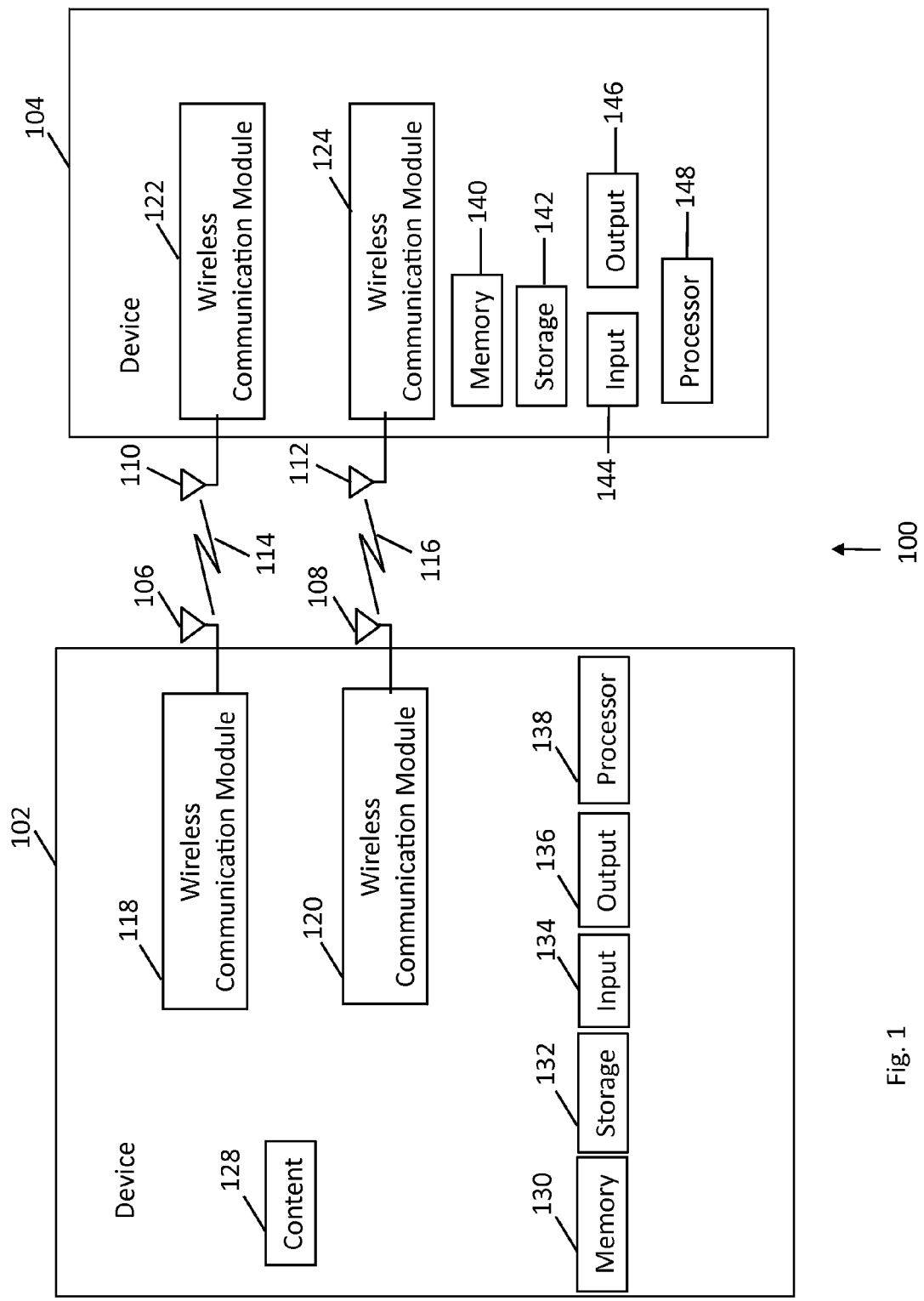
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a netbook, a server computer, a handheld computer, a handheld device, a Personal Digital Assistant (PDA) device, a handheld PDA device, an on-board device, an off-board device, an electronic commerce (e-Commerce) system, an electronic store (e-store), an electronic kiosk (e-kiosk), a device and/or system capable of offering electronic goods (e-goods) and/or electronic content (e-content), a Near-Field-Communication (NFC) device and/or system, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), NFC, Wi-Fi, Wireless-Gigabit (WiGig), Wi-Max, ZigBee™, Ultra-Wideband (UWB), Global System for Mobile communication (GSM), 2G, 2.5G, 3G, 3.5G, Enhanced Data rates for GSM Evolution (EDGE), or the like.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

Reference is now made to FIG. 1, which schematically illustrates a block diagram of a system 100 in accordance with some demonstrative embodiments.

In some demonstrative embodiments, system 100 may include one or more devices, e.g., devices 102 and 104, capable of communicating wireless signals over at least first and second wireless communication links of at least first and second wireless communication protocols, for example, a wireless communication link 114 of a first wireless communication protocol, and a wireless communication link 116 to a second wireless communication protocol, e.g., as described below.

For example, device 102 may include a wireless communication module 118 capable of communicating over link 114 via one or more antennas 106 according to the first wireless communication protocol; and a wireless communication module 120 capable of communicating over link 116 via one or more antennas 108 according to the second wireless communication protocol. Device 104 may include a wireless communication module 122 capable of communicating over link 114 via one or more antennas 110 according to the first wireless communication protocol; and a wireless communication module 124 capable of communicating over link 116 via one or more antennas 112 according to the second wireless communication protocol. Antennas 106, 108 110 and/or 112 may include any type of antennas suitable for transmitting and/or receiving wireless communication signals, blocks, frames, transmission streams, packets, messages and/or data. Types of antennas that may be used for antennas 106, 108 110 and/or 112 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 106, 108 110 and/or 112 may implement transmit and receive functionalities using separate transmit and receive antenna elements. In some embodiments, antennas 106, 108 110 and/or 112 may implement transmit and receive functionalities using common and/or integrated transmit/receive elements.

In some demonstrative embodiments, the first wireless communication protocol may have a first coverage range and the second wireless communication protocol may have a second coverage range, greater than the first coverage range.

In some demonstrative embodiments, the first wireless communication protocol may have a first transmission rate and the second wireless communication protocol ("also referred to as the ("high-speed wireless protocol") may have a second transmission rate, greater than the first transmission rate.

For example, the first wireless communication protocol may include a Near-Field-Communication (NFC) protocol, and link 114 may include an NFC link. The second wireless communication protocol may include a WiFi protocol, a WiGig protocol, a millimeter wave (mmwave) protocol, or the like, and link 116 may include a WiGig link, a mmwave link, or the like.

The NFC protocol may include a communication protocol in accordance with *ISO/IEC* 14443 *Parts* 1-4: *Identification cards—Contactless integrated circuit(s) cards,* 1999, *ISO/IEC* 18092: *Information technology—Telecommunications and information exchange between systems—Near Field Communication—Interface and Protocol (NFCIP-1), SO/IEC* 21481:2005: *Information technology—Telecommunications and information exchange between systems—Near Field Communication Interface and Protocol-2 (NFCIP-2),* and/or *NFC Forum Data Exchange Format (NDEF) Technical Specification Version* 1.0, Jul. 24, 2006 ("the NFC specifications") and/or future versions and/or derivatives thereof.

The WiFi protocol may include a communication protocol in accordance with the IEEE 802.11 specifications (*IEEE 802.11-2007, IEEE Standard for Information Technology—Telecommunications and information exchange between systems—Local and metropolitan area networks—Specific requirements, Part* 11: *Wireless LAN Medium Access Control (MAC) and Physical Layer (PHY) Specifications*) and/or future versions and/or derivatives thereof.

The WiGig protocol may include a communication protocol in accordance with *IEEE P802.11ad/D1.0 Draft Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 5: *Enhancements for Very High Throughput in the* 60 *GHz Band,* and/or *Wireless Gigabit Alliance WiGig Mac and PHY specification Version*1.0, April 2010 ("the WiGig specifications") and/or future versions and/or derivatives thereof.

For example, link 114 may have a coverage range of 20 centimeters (cm) or les, e.g., 4 cm or less, and/or may operate at a frequency of about 13.56 Megahertz (MHz) and/or at rates ranging from 106 kilobit per second (kbit/s) to 848 kbit/s.

For example, link 116 may have a coverage range of at least 1 meter, for example, at least 5 meters, e.g., up to about 100 meters or more. Link 116 may include a WiGig link operating at a frequency of about 60 Ghz and/or at rates of at least 1 gigabit per second (gbit/s), e.g., at least 5 gbit/s. Alternatively, link 116 may include a WiFi link operating at a frequency of about 2.4 Gigahertz (GHz), or 5 GHz and/or at rates of at least 90 mbit/s, e.g., at least 360 mbit/s. Alternatively, link 116 may include a mmwave link operating at a frequency of between 30-300 GHz and/or at rates of at least 1 Gbit/s.

In some demonstrative embodiments, the first wireless communication protocol may have a relatively very fast and/or automatic setup and/or association procedure. For example, wireless communication modules 108 and/or 122 may be configured to associate and/or setup link 114 automatically and/or within a very short time period, for example, of less than one minute, for example, less than 10 seconds, e.g., less than a second, for example, in accordance with the NFC specification.

In one example, wireless communication modules 108 and/or 122 may be configured to associate and/or setup link 114 and/or perform any additional operations and/or exchange information according to a suitable NFC "tap & go" procedure, "tap & buy" procedure, "tap & pay" procedure, and the like, for example, as defined by the NFC specifications, *WiFi Alliance Wi-Fi Protected Setup Specification Version* 1.0*h,* and/or *NFC Forum Connection Handover* 1.2 *Technical Specification,* Jul. 7, 2010. For example, wireless communication modules 108 and/or 122 may be configured to associate and/or setup link 114 when a user of device 104 taps device 104 on device 102 and/or performs any other suitable predefined movement of device 104 relative to device 102.

Additionally, wireless communication modules 108 and/or 122 may be configured to enable the user of device 104 to perform a transaction of monetary value with device 102, e.g., securely. For example, wireless communication modules 108 and/or 122 may be configured to enable the user of device 104 to perform a transaction of monetary value according to the NFC "tap & go" procedure, the "tap & buy" procedure, the "tap & pay" procedure, and the like. For example, wireless communication module 122 may be configured to perform a transaction of monetary value with wireless communication module 108 when the user of device 104 taps device 104 on device 102 and/or performs any other suitable predefined movement of device 104 relative to device 102. The transaction of monetary value may include, for example, transferring from device 104 to device 102 any suitable billing and/or credit data sufficient for performing the transaction.

In other embodiments, the at least first and second wireless communication protocols may include any other suitable wireless communication protocols, e.g., in addition to or instead of the NFC and/or WiGig communication protocols.

In some demonstrative embodiments, at least one of devices 102 and 104 may include or may be included as part of, for example, a computing device, a communication device, a wireless communication device, an electronic device, a circuit, and/or any other suitable device. For example, device 102 may include or may be included as part of a PC, a desktop computer, a mobile computer, a laptop computer, a notebook computer, a netbook, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, an e-Commerce device, an e-store device, an e-kiosk device, a device capable of offering e-goods and/or e-content, a NFC device, a mobile or portable device, a non-mobile or non-portable device, a cellular telephone, a handset, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, an AP, a base station, or the like.

In some demonstrative embodiments, device 102 may also include, for example, one or more of a processor 138, an input unit 134, an output unit 136, a memory unit 130, and a storage unit 132. Device 102 may optionally include other suitable hardware components and/or software components. In some embodiments, some or all of the components of device 104 may be enclosed in a common housing or packaging, and may be interconnected or operably associated using one or more wired or wireless links. In other embodiments, components of device 102 may be distributed among multiple or separate devices or locations.

In some demonstrative embodiments, device 104 may also include, for example, one or more of a processor 148, an input unit 144, an output unit 146, a memory unit 140, and a storage unit 142. Device 104 may optionally include other suitable hardware components and/or software components. In some embodiments, some or all of the components of device 104 may be enclosed in a common housing or packaging, and may be interconnected or operably associated using one or more wired or wireless links. In other embodiments, components of device 104 may be distributed among multiple or separate devices or locations.

Processor 138 and/or processor 148 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 138 executes instructions, for example, of an Operating System (OS) of device 102; and/or of one or more suitable applications. Processor 148 executes instructions, for example, of an Operating System (OS) of device 104; and/or of one or more suitable applications.

Input unit 134 and/or input unit 144 includes, for example, a keyboard, a keypad, a mouse, a touch-pad, a track-ball, a stylus, a microphone, or other suitable pointing device or input device. Output unit 136 and/or output unit 146 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 130 and/or memory unit 140 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 132 and/or storage unit 142 includes, for example, a hard disk drive, a floppy disk drive, a Compact Disk (CD) drive, a CD-ROM drive, a DVD drive, or other suitable removable or non-removable storage units. Memory unit 130 and/or storage unit 132, for example, store data processed by device 102. Memory unit 140 and/or storage unit 142, for example, store data processed by device 104.

In some demonstrative embodiments, device 102 may be configured to provide suitable requested content 128 to device 104 via link 116, e.g., as described below.

The term "content" as used herein may refer to any suitable digital data and/or information in any suitable format, e.g., a file, a record, and the like. In some embodiments, content 128 may include audio content, video content, textual content, and the like. For example, content 128 may include a movie, an audio file, a music file, a game, a digital newspaper, a digital magazine, a digital book, a digital navigation map, en electronic-leaflet (e-leaflet) and the like.

In some demonstrative embodiments, content 128 may have a relatively large data size, for example, a data size of at least 5 megabytes (MB), e.g., at least 100 MB, e.g., at least 1 gigabyte (GB). In one example, content 128 may include a digital book having a size of about 5 MB, a digital magazine having a size of about 50 MB, a digital music album having a size of about 200 MB, a mobile movie having a size of about 2 GB, a High Definition movie having a size of about 12 GB, a mobile game having a size of about 700 MB, a console game having a size of about 7.5 GB, and the like.

In some demonstrative embodiments, content 128 may include content to be purchased by the user of device, e.g., as part of a monetary transaction between devices 102 and 104. In other embodiments, content 128 may be provided from device 102 to device 104 free of charge.

In one example, device 102 may include, or may be included as part of, an ecommerce device, e.g., an e-kiosk or an e-store and the like. For example, device 102 may be located at a public or private location, e.g., a gas station, a store, a supermarket, a museum, and the like. Device 104 may include, or may be included as part of, for example, a mobile or portable user device, e.g., a smart-phone, a tablet computer, a netbook, and the like. For example, content 128 may include suitable content, e.g., video content, audio content, and the like, which may be purchased by the user of device 104.

In another example, device 104 may include, or may be included as part of, a non-portable deice, e.g., a desktop computer, a PC, a game console, a smart television (smartTV), and the like; and/or device 102 may include a mobile or portable user device, e.g., a smart-phone, a tablet computer, a netbook, a portable memory device, a memory stick, and the like. For example, content 128 may include a file, folder, document and/or presentation, which may be transferred from device 102 to be processed by device 104.

In yet another example, devices 102 and 104 may include two mobile or portable user devices of two respective users. For example, devices 102 and/or 104 may include a smartphone, a tablet computer, a netbook and the like. For example, content 128 may include a file, folder, document and/or presentation, which may be transferred from device 102 to device 104.

In yet another example, content 128 may include a suitable e-leaflet. For example, device 102 may be located at a museum, a service center, a medical facility, a governmental facility, and the like.

In some demonstrative embodiments, link 114 may have a relatively short coverage range, and/or a relatively low transmission rate, e.g., compared to the coverage range and/or transmission rate of link 116. Accordingly, transferring content 128 over link 114 may require maintaining devices 102 and 104 at relatively close proximity for a relatively long time period, e.g., during the transmission of content 128.

In some demonstrative embodiments, devices 102 and 104 may be configured to perform on-the-spot purchase and/or distribution of e-content, e.g., content 128, over a wireless medium. For example, devices 102 and 104 may be configured to utilize link 114, e.g., a NFC link, to initialize a session between devices 102 and 104, to provide an indication and/or selection of the requested content to be provided from device 102 to device 104, and/or to perform a monetary transaction with respect to the requested content, e.g., as described below.

In some demonstrative embodiments, device 102 may inquire device 104 over link 114 regarding capabilities of device 104 with respect to the second wireless communication protocol and/or capabilities of device 104 with respect to handling the requested data, e.g., as described below.

In some demonstrative embodiments, devices 102 and 104 may be capable of handing off the session from link 114 to link 116, for example, by utilizing link 114 to pair between devices 102 and 104 for link 116, e.g., as described below.

In some demonstrative embodiments, link 114 may be utilized by devices 102 and 104 for the setting up of link 116, e.g., within a relatively short time period and/or automatically. Link 116 may then be utilized for transferring content 128 from device 102 to device 104, e.g., within a relatively short time period and/or while allowing devices 102 and 104 to be moved away from one another, e.g., out of the range of link 114.

In some demonstrative embodiments, wireless communication module 122 may use link 114 to indicate to wireless communication module 118 requested content 128 to be transferred from device 102 to device 102. For example, the user of device 104 may tap device 104 on device 102 in a manner indicative of a selection of content 128. For example, device 102 may include a display to display a representation of a one or more content elements 128, and the user of device 104 may indicate a selected content element 128, e.g., by tapping device 104 on the representation of the selected content 128.

In some demonstrative embodiments, in response to the request, wireless communication module 118 may transmit over link 114 a session-handoff message to wireless communication module 122. The session-handoff message may include one or more link-related parameters defining wireless communication link 116, e.g., as described in detail below.

In some demonstrative embodiments, wireless communication modules 120 and 124 may establish a session over link 116 using the link-related parameters, and wireless communication modules 120 may transmit requested content 128 to wireless communication module 124 over link 116.

In some demonstrative embodiments, the link-related parameters may include a frequency channel parameter relating to a frequency channel to be used for link 116, a modulation type parameter relating to a modulation scheme to be used for communication over link 116, a media-access-control (MAC) parameter to be used for communication over link 116, a security parameter relating to one or more security settings for communication over link 116, a beamforming parameter related to a beamforming scheme to be used for communication over link 116, and/or any other suitable parameter relating to and/or defining link 116.

In one example, the session-handoff message may include a field indicative of the second wireless communication protocol. For example, the session-handoff message may include a first value indicating the WiFi protocol, a second d value indicating the WiGig protocol, and so on. The session-handoff message may include a field indicative of the channel to be used for link 116. For example, the session-handoff message may include a first value defining a Center Frequency (CF) of the channel, a second value defining a bandwidth of the channel and/or any other value defining the channel. The session-handoff message may include a field indicative of a modulation scheme to be utilized for communication over link 116. For example, the session-handoff message may include one or more values defining a constellation scheme, an Error Correction Code (ECC), a Multi-Input-Multi-Output (MIMO) configuration, e.g., a number of transmit antennas and receive antennas, to be used by link 116, and/or any other suitable value. The session-handoff message may include a field indicative of one or more MAC parameters of link 116. For example, the session-handoff message may include one or more values defining a packet size, an aggregation length and/or any other MAC parameter. The session-handoff message may include a field indicative of one or more beamforming parameters to of link 116. For example, the session-handoff message may include one or more parameters defining antenna beam directivity of one or more transmit antennas of module 120 relative to an NFC antenna plane between devices 102 and 104. The session-handoff message may include a field indicative of one or more security parameters to be used over link 116. For example, the session-handoff message may include one or more parameters defining one or ore session keys, e.g., temporal session keys, to be used for secure communication over link 116.

In some demonstrative embodiments, device 102 may monitor channel conditions, e.g., interference levels, of a plurality of wireless communication channels. For example, wireless communication module 120 may determine the interference levels of the plurality of channels, for example, based on received channel interference levels, based on a detected activity of other devices, an/or using any other suitable method or procedure.

In some demonstrative embodiments, device 102 may prioritize the plurality of channels and/or select from the plurality of wireless communication channels the wireless communication channel to be used for wireless communication link 116, for example, based on the monitored channel conditions.

In some demonstrative embodiments, wireless communication module 118 may determine the link-related parameters to be used for link 116, for example, based on one or more device-configuration parameters corresponding to device 104. For example, wireless communication module 118 may receive the one or more device-configuration parameters from wireless communication module 122 over link 114.

In some demonstrative embodiments, the device-configuration parameters may include at least one communication-configuration parameter indicating a capability of device 104 to communicate according to the second wireless communication protocol, at least one processing-configuration parameter indicating a capability of device 104 to process content 128, and/or any other suitable information relating to capabilities of device 104 with respect to content 128 and/or the second wireless communication protocol.

In some demonstrative embodiments, the at least one communication-configuration parameter may include, for example, a parameter defining a type of the second wireless communication protocol supported by device 104, e.g., indicating whether device 104 supports WiGig communication, WiFi communication and/or any other suitable type of communication. Additionally or alternatively, the at least one communication-configuration parameter may include, for example, a parameter defining communication modes and/or speeds supported by device 104, a MAC address of device 104, and the like.

In some demonstrative embodiments, the processing-configuration parameter may relate, for example, to a buffering capability of device 104, a write-speed capability of device 104, e.g., a speed at which device 104 may store content 128 in storage 142; a display capability of device 104, e.g., one or more display-related parameters of output 146; free memory space of device 104, e.g., a free space on storage 142 and/or memory 140; a power level of device 104, and/or any other suitable parameter relating to capabilities of device 104 with respect to handling content 128.

In some demonstrative embodiments, wireless communication module 118 may determine a version of the requested content 128 to be transmitted to device 104 based on the device-configuration parameters. For example device 102 may maintain two or more versions of content 128, e.g., a first version to be provided to devices having first device-configuration parameters, a second version to be provided to devices having second, different, device-configuration parameters, and so on.

In one example, content 128 may include a movie file. A first version of the movie file may be suitable for processing by a device, which may be low on storage and/or processing resources, while second version of the movie file may be suitable for processing by a device, which may be high on storage and/or processing resources. For example, the second version of the movie may have an increased quality relative to a quality of the first version of the movie, e.g., the second version of the movie may include a High-Definition (HD) version of the movie, which may require increased processing, display and/or storage capabilities. Wireless communication module 118 may to provide the first version of the movie to device 104, e.g., if device 104 has relatively low resources, e.g., if device 104 includes a mobile phone. Wireless communication module 118 may to provide the second version of the movie to device 104, e.g., if device 104 has relatively high resources, e.g., if device 104 includes a tablet computer.

In some demonstrative embodiments, device 102 may perform a monetary transaction for receiving payment for content 128 provided to the user of device 104.

In some demonstrative embodiments, wireless communication module 118 may receive from wireless communication module 122 over link 114 billing data sufficient for performing a monetary transaction with respect to the requested content 128.

In some demonstrative embodiments, wireless communication module 118 may receive the billing data from wireless communication module 122 according to the NFC "tap & go" procedure, "tap & buy" procedure, "tap & pay" procedure, and the like.

In some demonstrative embodiments, after providing the link-related parameters to wireless communication module 122 and/or after receiving the billing data from wireless communication module 122, wireless communication module 118 may be free to communicate with another wireless communication device over a link of the first wireless communication protocol.

Accordingly, in some demonstrative embodiments, wireless communication module 118 may receive another request from another device over another communication link of the first wireless communication protocol during at least part of the transmitting of content 128 over link 116.

Therefore, in some demonstrative embodiments, device 102 may be capable of handling the transferring of relatively large amounts of content to many devices, e.g., efficiently and/or at relatively short time periods. For example, a user of a first device 104 may tap the first device on device 102 to select a first content via link 114. Device 102 may use link 114 to send the link-related parameters to be used for establishing a session over link 116, and then transfer the first content to the first device via link 116. A user of a second device 104 may tap the second device on device 102, e.g., while device 102 is transferring the first content to the first device, to select a second content via link 114.

In some demonstrative embodiments, wireless communication module 118 and wireless communication module 122 may utilize one or more suitable session keys for communication over link 114. Wireless communication module 118 and wireless communication module 122 may transfer the session keys to wireless communication module 120 and wireless communication module 124, respectively, which may use the session keys for communicating over link 116.

Figure 2:
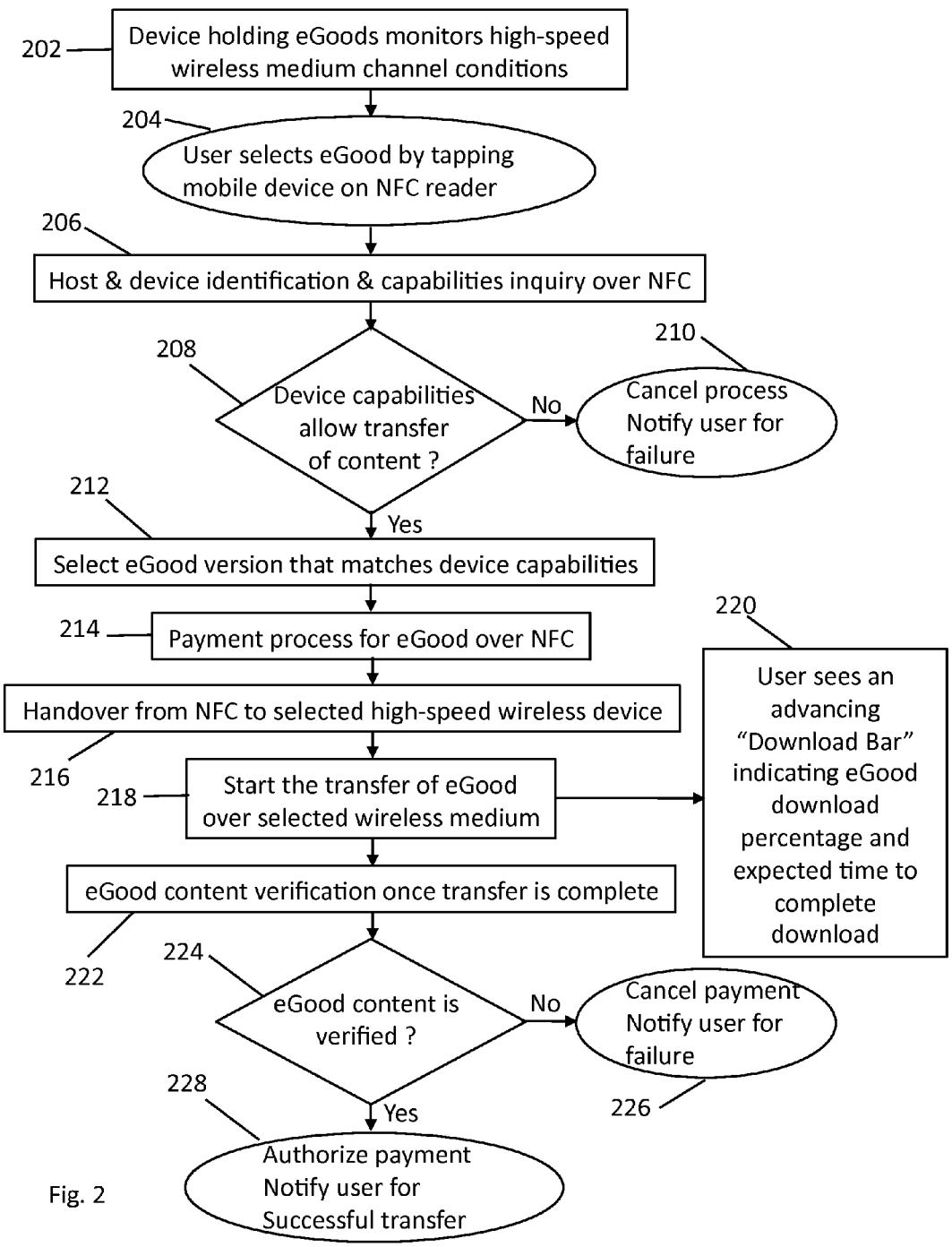
FIG. 2 is a schematic flow-chart illustration of a method of wirelessly delivering content, in accordance with some demonstrative embodiments.

Reference is now made to FIG. 2, which schematically illustrates a method of wirelessly delivering content, in accordance with some demonstrative embodiments. In some embodiments, one or more operations of the method of FIG. 2 may be performed by a system e.g., system 100 (FIG. 1), and/or by one or more wireless communication devices, e.g., device s102 and/or 104 (FIG. 1), communicating over a first link according to a first wireless communication protocol, e.g., an NFC protocol, and over a second link according to a second wireless communication protocol, e.g., WiFi, WiGig, and the like.

As indicated at block 202, the method may include monitoring at a first wireless communication device channel conditions of a plurality of wireless communication channels of a wireless medium according to the second wireless communication protocol ("the high-speed wireless medium"). For example, device 102 (FIG. 1) may monitor channel conditions of a plurality of wireless communication channels suitable fro link 116 (FIG. 1).

As indicated at block 204, the method may include receiving at the first wireless device a request indication from a second wireless device over the first link. For example, a user of device 104 (FIG. 1) may select content 128 (FIG. 1), e.g., by tapping device 104 (FIG. 1) on device 102, by using a smart poster NFC reader, or using any other NFC content-selection method.

As indicated at block 206, the method may include exchanging information between the first and second devices over the first link. For example, device 102 (FIG. 1) may provide device 102 (FIG. 1) with a MAC address of device 102 (FIG. 1) to be used for communication over link 116 (FIG. 1). Device 102 (FIG. 1) may receive from device 104 (FIG. 1) a MAC address of device 104 (FIG. 1) to be used for communication over link 116 (FIG. 1). Device 102 (FIG. 1) may receive from device 104 (FIG. 1) one or more device configuration parameters corresponding to device 104 (FIG. 1). The device configuration parameters may include, for example, an indication of one or more types of communication protocols supported by device 104 (FIG. 1), e.g., whether or not device 104 (FIG. 1) supports WiFi communication, WiGig communication, and/or any other communication protocols; an indication of a free memory space and/or a sustained write speed of device 104 (FIG. 1); and/or an indication of playback capabilities of device 104 (FIG. 1), e.g., audio and/or video capabilities of device 104 (FIG. 1).

As indicated at block 208, the method may include determining whether or not the second wireless device may be capable of receiving and/or handling the requested content, for example, based on the device configuration parameters. For example, device 102 (FIG. 1) may determine whether or not device 104 (FIG. 1) is capable of receiving and/or handling the requested content 128 (FIG. 1), e.g., based on the device configuration parameters.

As indicated at block 210, the method may include terminating the process of transferring the requested content, e.g., if it is determined that the second wireless device is not capable of receiving and/or handling the requested content. For example, device 102 (FIG. 1) may cancel the transfer of the requested content 128 (FIG. 1). Device 102 (FIG. 1) may send a notification to device 104 (FIG. 1) via link 114 (FIG. 1) that the requested content may not be provided. Additionally or alternatively, device 102 (FIG. 1) may display a failure notification to the user of device 104 (FIG. 1).

As indicated at block 212, the method may include selecting a version of the requested content to be provided to the second device, for example, based on the device configuration parameters. For example device 102 (FIG. 1) may maintain two or more versions of the requested content 128 (FIG. 1), and device 102 (FIG. 1) may determine a version of the requested content 128 to be transmitted to device 104 (FIG. 1) based on the device-configuration parameters, e.g., as described above.

In some demonstrative embodiments, the method may include performing a transaction of monetary value with respect to the requested content, for example, in order to receive payment from the user of the second device in response to the requested content.

As indicated at block 214, the method may include transferring over the first link from the second device to the first device billing data sufficient to perform a monetary transaction with respect to the requested content. For example, devices 102 and 104 (FIG. 1) may perform a suitable payment process, e.g., a suitable secure payment process, over the NFC link, e.g., according to any suitable NFC payment protocol.

As indicated at block 216, the method may include handing over a session between the first and second devices from the first link to the second link. For example, device 102 (FIG. 1) may transmit over link 114 (FIG. 1) a session-handoff message to device 104 (FIG. 1). The session-handoff message may include one or more link-related parameters defining wireless communication link 116 (FIG. 1), e.g., as described above.

In some demonstrative embodiments, handing over the session between the first and second devices from the first link to the second link may also include transferring one or more session keys between the first and second devices from the first link, and using the session keys for communication keys between the first and second devices from the second link.

As indicated at block 218, the method may include transferring the requested content from the first device to the second device over the second link. For example, device 102 (FIG. 1) may transfer the requested content 128 (FIG. 1) to device 04 (FIG. 1) over link 116 (FIG. 1), which may be established according to the session-handoff message, e.g., as described above.

As indicated at block 220, the method may include providing a user of the second device with an indication of the status of the transferring of the requested content. For example, device 104 (FIG. 1) may display a download bar or any other suitable indication.

In some demonstrative embodiments, the first device may be free to communicate with another wireless communication device over the NFC link, for example, while the requested data is being transferred over the second link. Accordingly, the first device may receive another request from another device over the NFC link during at least part of the transmitting of the requested content to the second device.

As indicated at blocks 222 and 224, the method may include verifying that the requested content has been successfully transferred to the second device.

As indicated at block 226, the method may include cancelling the monetary transaction with respect to the requested content, e.g., if the requested content has not been transferred successfully. For example, device 102 (FIG. 1) may cancel any monetary transaction with respect to billing data received from device 104 (FIG. 1) with respect to the requested content 128 (FIG. 1). Device 102 (FIG. 1) may send a notification to device 104 (FIG. 1) via link 116 (FIG. 1) that the requested content may not be provided. Additionally or alternatively, device 102 (FIG. 1) may display a failure notification to the user of device 104 (FIG. 1).

As indicated at block 228, the method may include authorizing the monetary transaction with respect to the requested content, e.g., if the requested content has been transferred successfully. For example, device 102 (FIG. 1) may authorize and/or perform a monetary transaction with respect to the billing data received from device 104 (FIG. 1) with respect to the requested content 128 (FIG. 1). Device 102 (FIG. 1) may send a notification to device 104 (FIG. 1) via link 116 (FIG. 1) that the requested content has been transferred. Additionally or alternatively, device 102 (FIG. 1) may display a success notification, e.g., "transfer complete", and/or provide a suitable proof of purchase to the user of device 104 (FIG. 1).

Some embodiments may be implemented using an article including one or more types of computer-readable storage media capable of storing data, including volatile memory, non-volatile memory, removable or non-removable memory, erasable or non-erasable memory, writeable or re-writeable memory, and the like. For example, the machine-readable storage medium may include, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some embodiments, the article may include logic in the form of instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some embodiments, the logic may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
    initializing by a first wireless communication module of a first wireless communication device a session with a second wireless communication device via a first wireless communication link of a first wireless communication protocol having a first coverage range;
    communicating by said first wireless communication module with said second wireless communication device over said first wireless communication link by utilizing one or more session keys;
    receiving by the first wireless communication module a request indicating requested content, and one or more device-configuration parameters from said second wireless communication device via said first wireless communication link;
    determining by the first wireless communication module that said requested content is to be provided to said second wireless communication device based on said device-configuration parameters;
    receiving by the first wireless communication module billing data from said second wireless communication device over the first wireless communication link;
    handing off, by the first wireless communication module, the session from said first wireless communication link to a second wireless communication link of a second wireless communication protocol having a second coverage range by transmitting a session-handoff message to the second wireless communication device;
    transferring by the first wireless communication module of the first wireless communication device the one or more session keys to a second wireless communication module of the first wireless communication device;
    transmitting by the second wireless communication module said requested content to said second wireless communication device over said second wireless communication link;
    securing by the second wireless communication module communication with the second wireless communication device over said second wireless communication link by using the one or more session keys;
    verifying by the first wireless communication device that said requested content has been successfully delivered to said second wireless communication device over said second wireless communication link; and
    authorizing by the first wireless communication device a payment using said billing data based on said verifying.

2. The method of claim 1, wherein the device-configuration parameters comprise at least one processing-configuration parameter indicating a capability of said second wireless communication device to process said requested content, the method comprising:
    determining a version of said requested content to be provided to said second wireless communication device based on said at least one processing-configuration parameter; and
    transmitting the determined version of said requested content from the second wireless communication module of said first wireless communication device to said second wireless communication device.

3. The method of claim 1, wherein the device-configuration parameters comprise at least one communication-configuration parameter indicating a capability of said second wireless communication device to communicate according to the second wireless communication protocol, the method comprising:
    determining one or more link-related parameters of said second wireless communication link based on said communication configuration parameter.

4. The method of claim 1 comprising canceling said payment if said requested content has not been successfully delivered to said second wireless communication device over said second wireless communication link.

5. The method of claim 2, wherein said at least one processing-configuration parameter relates to at least one attribute selected from the group consisting of a buffering capability of said second wireless communication device, a write-speed capability of said second wireless communication device, a display capability of said second wireless communication device, free memory space of said second wireless communication device, and a power level of said second wireless communication device.

6. The method of claim 1, wherein receiving said request comprises receiving said request via a tapping of said second wireless communication device on said first wireless communication device, and wherein the method comprises automatically performing, in response to said tapping, the receiving of said device-configuration parameters, the transmitting of said session-handoff-message, and the transmitting of said requested content.

7. The method of claim 1 comprising, during at least part of the transmitting of said requested content over said second wireless communication link:
    receiving another request for content from another device via another communication link of said first wireless communication protocol.

8. The method of claim 1 comprising:
monitoring at said first wireless communication device interference levels of a plurality of wireless communication channels; and
based on said interference levels selecting from said plurality of wireless communication channels a wireless communication channel for said second wireless communication link.

9. The method of claim 3, wherein said link-related parameters include at least one parameter selected from the group consisting of a frequency channel parameter, a modulation type parameter, a media-access-control parameter, a security parameter, and a beamforming parameter related to said second wireless communication link.

10. The method of claim 1, wherein said first wireless communication link comprises a Near-Field-communication (NFC) link.

11. An apparatus comprising:
a first wireless communication device including:
one or more antennas;
one or more processors; and
a memory having stored thereon instructions, which, when executed by the one or more processors, cause the first wireless communication device to perform operations comprising:
initializing by a first wireless communication module of the first wireless communication device a session with a second wireless communication device via a first wireless communication link of a first wireless communication protocol having a first coverage range;
communicating by said first wireless communication module with said second wireless communication device over said first wireless communication link by utilizing one or more session keys;
receiving by the first wireless communication module a request indicating requested content, and one or more device-configuration parameters from said second wireless communication device via said first wireless communication link;
determining by the first wireless communication module that said requested content is to be provided to said second wireless communication device based on said device-configuration parameters;
receiving by the first wireless communication module billing data from said second wireless communication device over the first wireless communication link;
handing off, by the first wireless communication module, the session from said first wireless communication link to a second wireless communication link of a second wireless communication protocol having a second coverage range by transmitting a session-handoff message to the second wireless communication device;
transferring by the first wireless communication module of the first wireless communication device the one or more session keys to a second wireless communication module of the first wireless communication device;
transmitting by the second wireless communication module said requested content to said second wireless communication device over said second wireless communication link;
securing by the second wireless communication module communication with the second wireless communication device over said second wireless communication link by using the one or more session keys;
verifying by the first wireless communication device that said requested content has been successfully delivered to said second wireless communication device over said second wireless communication link; and
authorizing by the first wireless communication device a payment using said billing data based on said verifying.

12. The apparatus of claim 11, wherein the device-configuration parameters comprise at least one processing-configuration parameter indicating a capability of said second wireless communication device to process said requested content, said apparatus is to operations comprising determining a version of said requested content to be provided to said second wireless communication device based on said at least one processing-configuration parameter, and transmitting by said second wireless communication module the determined version of said requested content.

13. The apparatus of claim 11, wherein the device-configuration parameters comprise at least one communication-configuration parameter indicating a capability of said second wireless communication device to communicate according to the second wireless communication protocol, the operations comprising determining one or more link-related parameters of said second wireless communication link based on said communication configuration parameter.

14. The apparatus of claim 11, wherein the operations comprise cancelling said payment if said requested content has not been successfully delivered to said second wireless communication device over said second wireless communication link.

15. The apparatus of claim 11, wherein the operations comprise receiving by said first wireless communication module a request from another device during at least part of the transmitting of said requested content over said second wireless communication link.

16. The apparatus of claim 13, wherein said link-related parameters include at least one parameter selected from the group consisting of a frequency channel parameter, a modulation type parameter, a media-access-control parameter, a security parameter, and a beamforming parameter related to said wireless communication link.

17. The apparatus of claim 11, wherein said first wireless communication link comprises a Near-Field-communication (NFC) link.

* * * * *